US008209121B1

(12) United States Patent
Ogale

(10) Patent No.: US 8,209,121 B1
(45) Date of Patent: Jun. 26, 2012

(54) REGISTRATION OF LOCATION DATA TO STREET MAPS USING HIDDEN MARKOV MODELS, AND APPLICATION THEREOF

(75) Inventor: Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1211 days.

(21) Appl. No.: 11/870,265

(22) Filed: Oct. 10, 2007

(51) Int. Cl.
*G01C 21/12* (2006.01)

(52) U.S. Cl. .......................... 701/495; 701/532; 701/536

(58) Field of Classification Search .................. 701/200, 701/207, 208, 213, 214
See application file for complete search history.

(56) References Cited

U.S. PATENT DOCUMENTS

| | | | | | |
|---|---|---|---|---|---|
| 6,038,559 | A | * | 3/2000 | Ashby et al. | 1/1 |
| 6,092,076 | A | * | 7/2000 | McDonough et al. | 1/1 |
| 6,118,404 | A | * | 9/2000 | Fernekes et al. | 342/357.43 |
| 6,202,023 | B1 | * | 3/2001 | Hancock et al. | 701/201 |
| 6,608,619 | B2 | * | 8/2003 | Omura et al. | 345/175 |
| 6,631,323 | B2 | * | 10/2003 | Tucker et al. | 701/221 |
| 6,708,109 | B1 | * | 3/2004 | Pradhan et al. | 701/207 |
| 6,782,319 | B1 | * | 8/2004 | McDonough | 701/208 |
| 6,862,526 | B2 | * | 3/2005 | Robbins | 701/214 |
| 6,950,059 | B2 | * | 9/2005 | Rapoport et al. | 342/357.27 |
| 6,965,827 | B1 | * | 11/2005 | Wolfson | 701/207 |
| 6,983,202 | B2 | * | 1/2006 | Sanqunetti | 701/207 |
| 7,096,117 | B1 | * | 8/2006 | Gale et al. | 701/208 |
| 7,263,472 | B2 | * | 8/2007 | Porikli | 703/2 |
| 7,299,126 | B2 | * | 11/2007 | Gedik et al. | 701/207 |
| 7,660,667 | B2 | * | 2/2010 | Furukawa | 701/212 |
| 7,855,678 | B2 | * | 12/2010 | Scherzinger et al. | 342/357.23 |
| 7,921,136 | B1 | * | 4/2011 | Shuman et al. | 707/802 |
| 2003/0006973 | A1 | * | 1/2003 | Omura et al. | 345/175 |
| 2004/0049337 | A1 | * | 3/2004 | Knockeart et al. | 701/201 |
| 2004/0181335 | A1 | * | 9/2004 | Kim et al. | 701/207 |
| 2005/0131635 | A1 | * | 6/2005 | Myllymaki et al. | 701/205 |
| 2005/0288911 | A1 | * | 12/2005 | Porikli | 703/2 |
| 2006/0041375 | A1 | * | 2/2006 | Witmer et al. | 701/208 |
| 2006/0087507 | A1 | * | 4/2006 | Urano et al. | 345/421 |
| 2006/0088214 | A1 | * | 4/2006 | Handley et al. | 382/176 |
| 2006/0125828 | A1 | * | 6/2006 | Harrison et al. | 345/441 |
| 2007/0061072 | A1 | * | 3/2007 | Wuersch et al. | 701/210 |

(Continued)

OTHER PUBLICATIONS

Wikipedia, "Particle Filter," Dec. 18, 2007. Downloaded from http://en.wikipedia.org/wiki/Particle_filter on Dec. 27, 2007, 5 pages.

(Continued)

*Primary Examiner* — Helal A Algahaim
(74) *Attorney, Agent, or Firm* — Sterne, Kessler, Goldstein & Fox, PLLC

(57) ABSTRACT

The present invention provides systems and methods for improving the accuracy of location data, such as GPS data. In an embodiment, the present invention adjusts coordinates by receiving a sequence of coordinates corresponding to a plurality of locations; identifying in a map database, for each location, polyline features within a distance from the coordinates for the location; calculating emission probabilities for the polyline features; calculating transition probabilities for the polyline feature; and adjusting the coordinates for the plurality of locations so that the adjusted coordinates correspond to polyline features belonging to a sequence of polyline features selected, based on the emission probabilities and the transition probabilities, to be the most likely sequence of polyline features that correspond to the sequence of coordinates. Besides improving accuracy, embodiments of this invention enable novel geospatial applications and user interfaces by adding a large amount of meta-information to a location.

20 Claims, 7 Drawing Sheets

U.S. PATENT DOCUMENTS

| | | | | |
|---|---|---|---|---|
| 2007/0118279 A1* | 5/2007 | Kudo | | 701/208 |
| 2007/0142050 A1* | 6/2007 | Handforth et al. | | 455/436 |
| 2008/0010262 A1* | 1/2008 | Frank | | 707/3 |
| 2008/0010605 A1* | 1/2008 | Frank | | 715/765 |
| 2008/0075357 A1* | 3/2008 | Yoon et al. | | 382/153 |
| 2008/0094250 A1* | 4/2008 | Myr | | 340/909 |
| 2008/0130955 A1* | 6/2008 | Harrison et al. | | 382/113 |
| 2008/0240497 A1* | 10/2008 | Porikli et al. | | 382/103 |
| 2008/0248813 A1* | 10/2008 | Chatterjee | | 455/456.2 |
| 2008/0262723 A1* | 10/2008 | Wuersch et al. | | 701/210 |
| 2008/0270366 A1* | 10/2008 | Frank | | 707/3 |
| 2008/0284643 A1* | 11/2008 | Scherzinger et al. | | 342/357.02 |
| 2009/0005972 A1* | 1/2009 | de Koning | | 701/208 |
| 2009/0040229 A1* | 2/2009 | Stitt et al. | | 345/441 |
| 2009/0093959 A1* | 4/2009 | Scherzinger et al. | | 701/215 |
| 2009/0187388 A1* | 7/2009 | Shu et al. | | 703/2 |
| 2010/0049765 A1* | 2/2010 | Asher et al. | | 707/723 |
| 2010/0169001 A1* | 7/2010 | Scherzinger et al. | | 701/206 |

OTHER PUBLICATIONS

Wikipedia, "Kalman Filter," Dec. 23, 2007. Downloaded from http://en.wikipedia.org/wiki/Kalman_filter on Dec. 27, 2007, 16 pages.

Wikipedia, "Hidden Markov Model," Dec. 11, 2007. Downloaded from http://en.wikipedia.org/wiki/Hidden_Markov_model on Dec. 27, 2007, 5 pages.

Wikipedia, "Viterbi Decoder," Nov. 27, 2007. Downloaded from http://en.wikipedia.org/wiki/Viterbi_decoder on Dec. 27, 2007, 5 pages.

* cited by examiner

REGISTRATION OF LOCATION DATA TO STREET MAPS USING HIDDEN MARKOV MODELS, AND APPLICATION THEREOF

FIELD OF THE INVENTION

The present invention relates to satellite-based positioning systems. More particularly, it relates to registration of location data to street maps.

BACKGROUND OF THE INVENTION

Global Positioning System (GPS) devices generate location data. The generated location data (e.g., latitude and longitude values), however, are not completely accurate. Particle filtering and Kalman filtering have both been used in an attempt to improve the accuracy of GPS location data. While these filtering techniques can be advantageous, both techniques have limitations. For example, both particle filtering and Kalman filtering do not give globally optimal solutions. Furthermore, both particle filtering and Kalman filtering typically require significant computing resources such as memory and processing time. Accordingly, there is a current need for new devices and techniques that overcome these and other deficiencies.

BRIEF SUMMARY OF THE INVENTION

The present invention provides systems and methods for improving the accuracy of location data generated, for example, using a satellite-based positioning device, and applications thereof. In an embodiment, a system according to the present invention includes a spatial indexer, an emission probability calculator, a transition probability calculator, and a pose optimizer. The spatial indexer receives a sequence of location data corresponding to a plurality of locations. For each location, the spatial indexer identifies in a map database polyline features within a distance D from the location. The emission probability calculator calculates emission probabilities for the polyline features identified by the spatial indexer. Each emission probability $E_{ij}$ represents the probability that a street on the map represented by a polyline feature $P_j$ emitted the observed location $C_i$. The transition probability calculator calculates transition probabilities for the polyline features identified by the spatial indexer. Each transition probability $T_{xy}$ represents the probability of a transition from a polyline feature $P_x$ to a polyline feature $P_y$. The pose optimizer adjusts the location data for the plurality of locations so that the adjusted location data correspond to polyline features belonging to a sequence of polyline features selected based on the emission probabilities calculated by the emission probability calculator and the transition probabilities calculated by the transition probability calculator.

In an embodiment, the present invention adjusts coordinates obtained using a satellite-based positioning device by (1) receiving a sequence of coordinates corresponding to a plurality of locations; (2) identifying in a map database, for each location, polyline features within a certain distance from the coordinates for the location; (3) calculating emission probabilities for the polyline features; (4) calculating transition probabilities for the polyline features; and (5) adjusting the coordinates for the plurality of locations so that the adjusted coordinates correspond to polyline features belonging to a sequence of polyline features selected based on the emission probabilities and the transition probabilities.

Besides improving accuracy, snapping GPS locations to street locations on a map enables novel geospatial applications and user interfaces by adding a large amount of meta-information to a location, such as the street address, navigation information (connected streets and intersections), nearby business information, etc.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements.

DETAILED DESCRIPTION OF EMBODIMENTS

The present invention provides systems and methods for improving the accuracy of location data generated, for example, using a satellite-based positioning device, and applications thereof. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
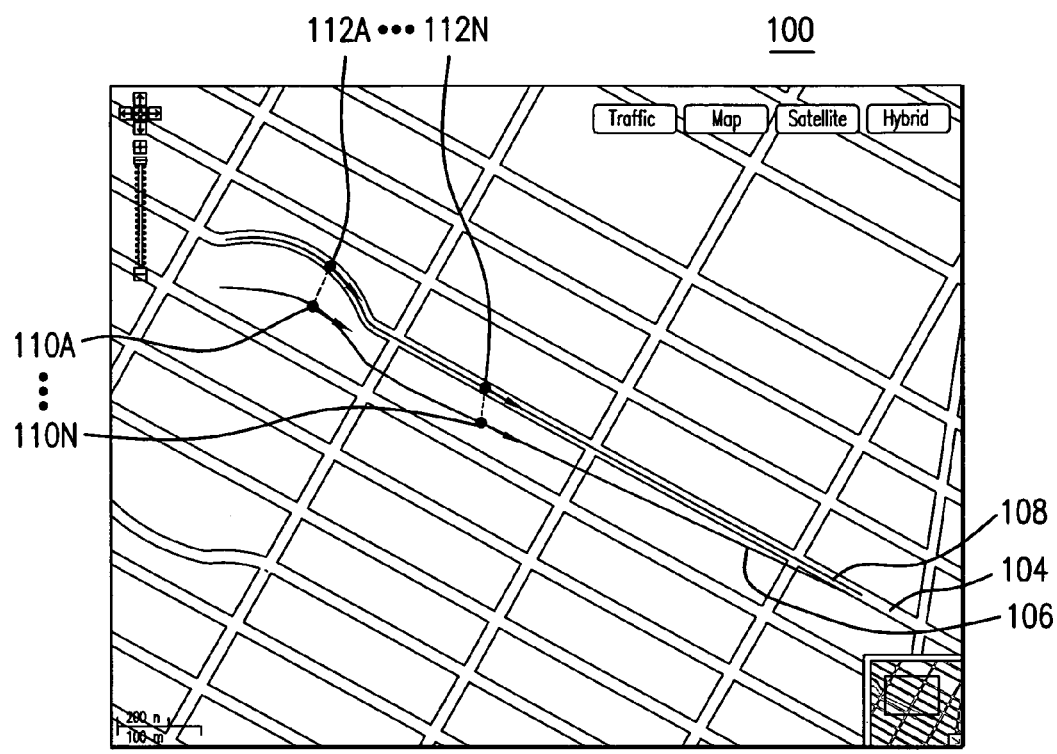
FIG. 1 is a diagram that illustrates an example street map with a sequence of location data adjusted to a location of polyline features on a map.

FIG. 1 is a diagram that illustrates an example street map 100. In map 100, streets such as street 104 are represented by polyline features. Each polyline feature includes information such as, for example, geometry information, a street name, an address, turn restrictions, number of street lanes, intersection information, identification of other polyline features to which it connects, etc.

FIG. 1 also illustrates how a sequence of location data 106 (e.g., generated using a satellite-based positioning device carried in a vehicle) is adjusted to form a sequence of adjusted location data 108 that corresponds to a set of polyline features used to represent street 104 of map 100. In FIG. 1, both the sequence of location data 106 and the sequence of adjusted location data 108 are represented by solid lines. In actuality, however, the sequence of location data and the sequence of adjusted location data can be sequences of non-continuous locations (e.g., non-continuous coordinates and headings). Such non-continuous locations (e.g., non-continuous coordinates and headings) are represented by locations 110A-110N and adjusted locations 112A-112N.

In an embodiment, each location 110A-110N includes both coordinate and heading information. The coordinate information can be, for example, latitude and longitude information. As noted herein, the location data can be generated using a satellite-based positioning system device, such as a GPS receiver, carried in a vehicle. The invention is not limited, however, to using just a GPS receiver. For example, the location data can be generated using other devices and/or sensors such as a vehicle wheel encoder. A vehicle wheel encoder estimates where a vehicle is located based on wheel movements. Using the present invention, it is possible to improve the accuracy of noisy measurements obtained using such devices and/or sensors and to correctly snap location data obtained using these devices and/or sensors to a street.

As illustrated in FIG. 1, the sequence of location data 106 (e.g., locations 110A-110N) is adjusted to form the sequence of adjusted location data 108 (e.g., adjusted locations 112A-112N). The sequence of adjusted location data 108 corresponds to the set of polyline features that represent street 104 in map 100. Thus, each adjusted location 112A-112N corresponds to a coordinate that lies along street 104 and has a heading corresponding to that associated with street 104.

As discussed earlier, conventional methods of snapping location data to a street include Kalman and particle filtering. Kalman and particle filtering snap location data on a point-by-point basis. For example, Kalman and particle filtering would snap a point (e.g., location 110A) to a new point (e.g., location 112A) without necessarily using information from all the other points (e.g., locations 110B-N) optimally. Embodiments of the present invention, however, optimally snap entire sequences of locations to sequences of polyline features that represent a street. These embodiments take advantage, for example, of the connectivity and heading information about the street. In other words, these embodiments take into consideration that a GPS receiver carried in a vehicle can not easily move from one street to another, unless the streets are connected. Taking into consideration this additional information enables embodiments of the present invention to adjust/snap correctly sequences of location data.

Figure 2:
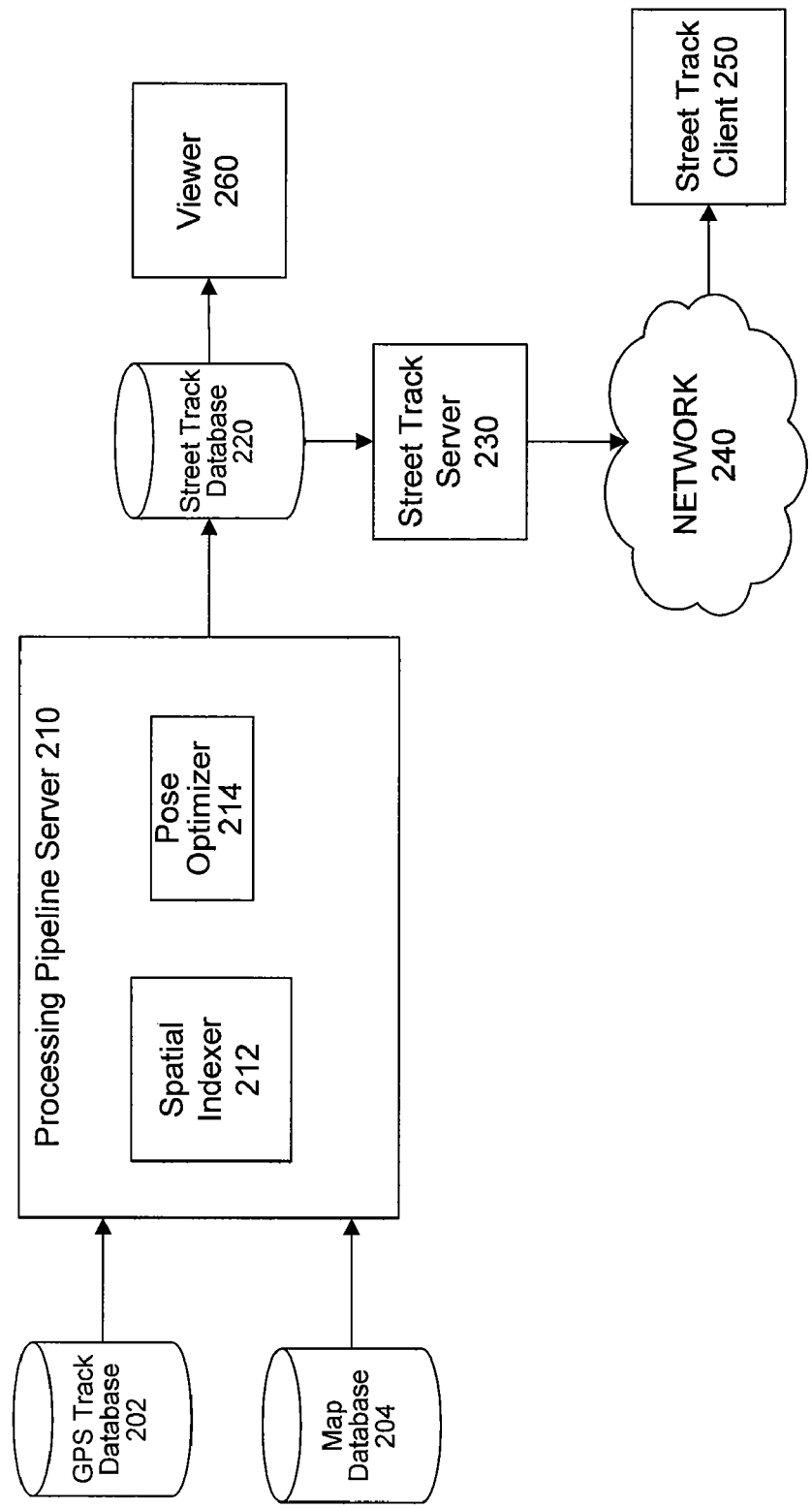
FIG. 2 is a diagram that illustrates a system according to an embodiment of the present invention that adjusts a sequence of location data to the location of polyline features on a map and that displays the adjusted data to a user.

FIG. 2 is a diagram of a system 200 according to an embodiment of the present invention. System 200 can adjust a sequence of location data to the location of polyline features on a map and display the adjusted data to a user.

In an embodiment, system 200 includes a GPS track database 202, a map database 204, a processing pipeline server 210, and a street track database 220. Data stored in street track database 220 is viewed, for example, using a street track server 230 and a street track client 250 that communicates with street track server 230 over a network 240 or using a viewer 260 coupled to street track database 220. Each of the elements shown in FIG. 2 can be any type of computing device. Example computing devices include, but are not limited to, a computer, a workstation, a distributed computing system, an embedded system, a stand-alone electronic device, a networked device, a mobile device, a rack server, a portable GPS device, a television, etc.

GPS track database 202 stores sequences of location data. The sequences of location data can be collected, e.g., using vehicles with GPS receivers and/or other sensors. Each location in a sequence of location data can include a coordinate and a heading. Each coordinate can include, for example, a latitude and a longitude.

Map database 204 stores information for one or more maps. These map(s) includes polyline features that represent, for example, a portion of a road, an intersection, an overpass, a bridge, a tunnel, etc. Each polyline feature typically has a unique identifier called a feature ID.

In an embodiment, map database 204 includes a feature index. The feature index maps the feature ID of a polyline feature to feature data. In the example of a road, feature data can include a road name, road geometry, road connectivity, whether the road is one-way or two-way, turn restrictions (e.g., no U-turns allowed), etc. Intersection features can contain feature IDs of roads terminating at the intersection. In this way, the feature index maintains, for example, information on the connectivity of the features.

In an embodiment, each polyline feature is accessible using a spatial index. A spatial index organizes polyline features into geographic areas called bins. In an embodiment, bins have a standard size (e.g., 50 meters by 50 meters), and each bin has a unique geographic ID (e.g., an s2cellID). Bins contain a list of feature IDs that lie within their associated geographical areas.

Processing pipeline server 210 processes data from the GPS track database, map database and possibly other databases (not shown). In an embodiment, processing pipeline server 210 receives a sequence of location data from GPS track database 202. Processing pipeline server 210 adjusts the location data to correspond with polyline features in map database 204. Processing pipeline server 210 writes the sequence of adjusted location data to street track database 220. Street track database 220 stores the sequence of adjusted location data. In this way, processing pipeline server 210 snaps sequences of location data, as opposed to snapping individual locations. This allows processing pipeline server 210, for example, to take into consideration knowledge of the continuity of polyline features such as streets and to correctly snap sequences of location data.

Processing pipeline server 210 contains a spatial indexer 212 and a pose optimizer 214. Spatial indexer 212 and pose optimizer 214 can be implemented as hardware, software, firmware or any combination thereof. Spatial indexer 212 looks up features corresponding to particular locations from GPS track database 220. Spatial indexer 212 gathers polyline features surrounding a location. For each polyline feature surrounding a location, spatial indexer 212 calculates the distance between the location and the polyline feature. Optionally, spatial indexer 212 also calculates a heading differential between the location and the polyline feature. The operation of spatial indexer 212 is described in more detail below. Spatial indexer 212 sends its information to pose optimizer 214.

Pose optimizer 214 adjusts and/or snaps each location for a sequence of location data to correspond to a location of a polyline feature stored in map database 204. Pose optimizer 214 uses surrounding polyline features and distances determined by spatial indexer 212 to adjust a sequence of location data. In an embodiment, pose optimizer 214 accomplishes this by treating the adjusted points as hidden states in a hidden Markov model. Pose optimizer 214 uses the Viterbi algorithm to decode the sequence of adjusted location data. The operation of pose optimizer 214 is described in more detail below.

Processing pipeline server 210 outputs sequences of adjusted location data determined by pose optimizer 214 to street track database 220. In an embodiment, street track database 220 stores information such as image panoramas that correspond to locations in sequences of adjusted location data.

In an embodiment, data stored in street track database 220 is viewed using street track server 230 and a street track client 250 that communicates with street track server 230 over a network 240. In an embodiment, street track client 250 includes a web browser that is used to view the data. The web browser can display, for example, an adjusted location data sequence as a line overlaying a map. When a user selects a point on a line, a photographic image taken from that location can be displayed. This example is merely illustrative and is not meant to limit the present invention.

In an embodiment, street track client 250 communicates with street track server 230 over a network 240 or a group of networks that together comprise the network 240 illustrated in FIG. 2. Network 240 can be any network or combination of networks that facilitate data communication. In embodiments, network 240 can include, but is not limited to, a local area network, a medium area network, and/or a wide area network such as the Internet. Network 240 can support protocols and technology including, but not limited to, World Wide Web protocols and/or services. Intermediate web servers, gateways, or other servers may be provided between street track server 230 and street track client 250.

Street track client 250 may request adjusted location data sequence from street track server 230. Street track server 230 retrieves adjusted location data from street track database 220. Street track server 230 formats the adjusted location data, and as an example, street track server 230 may overlay the adjusted location data on a map. Street track server 230 may include a web server. A web server is a software component that responds to a hypertext transfer protocol (HTTP) request with an HTTP reply. As illustrative examples, the web server may be, without limitation, an Apache HTTP Server, an Apache Tomcat, a Microsoft Internet Information Server, a JBoss Application Server, a WebLogic Application Server, or a Sun Java System Web Server. The web server may serve content such as hypertext markup language (HTML), extendable markup language (XML), documents, videos, images, multimedia features, or any combination thereof. This example is strictly illustrative and does not limit the present invention.

Figure 3:
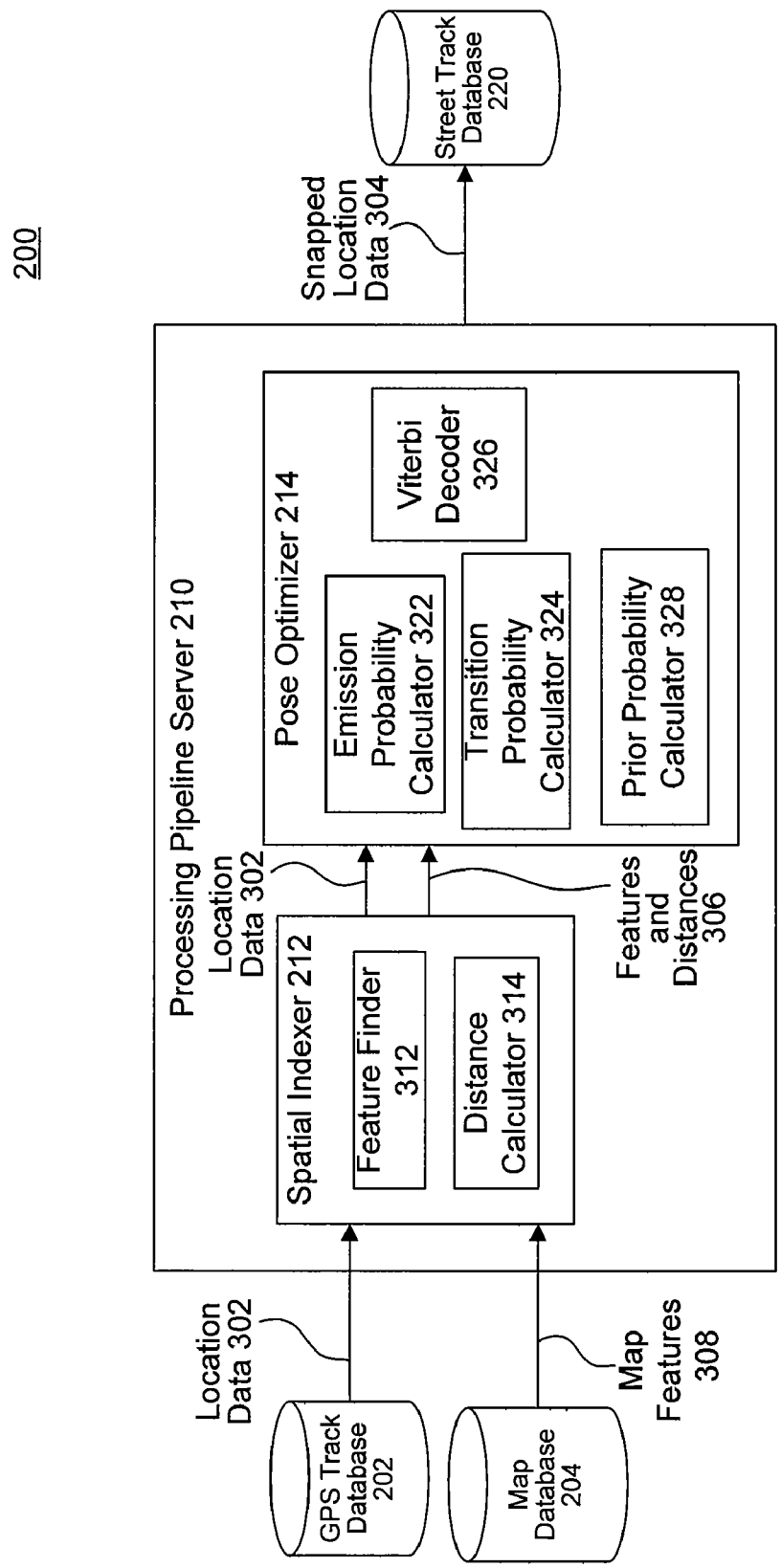
FIG. 3 is a diagram that illustrates the system of FIG. 2 in more detail.

FIG. 3 is a diagram that illustrates various elements of system 200 in more detail. As shown in FIG. 3, in an embodiment, spatial indexer 212 includes a feature finder 312 and a distance calculator 314. Pose optimizer 214 includes, in an embodiment, an emission probability calculator 322, a transition probability calculator 324, a prior probability calculator 328, and a Viterbi decoder 326.

As illustrated in FIG. 3, spatial indexer 212 receives a sequence of location data 302 from GPS street track database 202. Sequence of location data 302 may be collected, for example, by one or more vehicles with GPS receivers and/or other sensors (e.g., wheel encoders). Each location in the sequence of location data can include coordinate and/or heading values. In an embodiment, each location in sequence of location data 302 may be collected at regular time and/or distance intervals. In an embodiment, the sequence of location data 302 may be received in real-time or near real-time. This means that the most recently collected location data in the sequence of location data was received by spatial indexer 212 soon after it was collected.

For each location in sequence of location data 302, feature finder 312 of spatial indexer 212 identifies polyline features within a radius R stored in map database 204. The radius R should be large enough to cover all possible polyline features to which the location could map. Therefore, the radius R should be larger, for example, than the error range, at a particular confidence interval, of the GPS receiver used to determine the location.

In an embodiment, feature finder 312 identifies features by recalling the s2cellID for each bin within radius R. Feature finder 312 uses the spatial index to get a list of all polyline features and corresponding feature information associated with bins within radius R. As shown in FIG. 3, the retrieved polyline features are identified as map features 308. Map features 308 include, for example, information such as geometry information, street name information, address information, turn restriction information, connectivity information, etc.

In certain situations, the bins may cover more area than the circle of radius R. As a result, polyline features may be recalled from map a database 204 that are outside the area of interest (e.g., the circle of radius R). Thus, in an embodiment, feature finder 312 includes logic that selects only features that lie within the area of interest. An example of this is described below.

After feature finder 312 recalls map features 308 for each location in the sequence of location data 302, distance calculator 314 calculates a distance between each location and each feature within radius R of that location. Optionally, spatial indexer 212 may also calculate a heading differential. Each of the polyline features has an associated geometry. A heading can be determined from the geometry. As an example, if the polyline feature is a portion of a curved road, a heading can be determined by taking the derivative of the curve. A heading difference may be calculated by taking the difference between the heading associated with the polyline feature and the heading associated with the location.

Spatial indexer 212 sends features and corresponding distances 306 to pose optimizer 214. Pose optimizer 214 uses this information to adjust location data 302 and to generate adjusted/snapped location data 304.

In an embodiment, emission probability calculator 322 of pose optimizer 214 calculates an emission probability. The emission probability is a function of a feature and a location. The emission probability is a probability of obtaining the location, for example, from the GPS receiver given that the GPS receiver is actually at a location associated with a particular map feature. For each location, emission probability calculator 322 calculates an emission probability for each feature within radius R of the location. How to calculate emission probabilities is described in more detail below.

Transition probability calculator 324 calculates transition probabilities. A transition probability is a probability of transitioning to one feature, for example, given that the GPS receiver is at another feature. If a transition is allowed, for example, from one road to another road (e.g., the roads meet at an intersection and there are no turn restrictions), the transition probability is assessed to be high. If a transition is disallowed (e.g., a transition between two roads that are not connected), the transition probability is assessed to be low. In an embodiment, disallowed transitions are not completely disallowed, they are just given a relatively low likelihood of occurring. How transition probabilities can be calculated is described in more detail below.

Prior probability calculator 328 of pose optimizer 214 calculates prior probabilities. A prior probability is a probability that the start of a sequence of location data was measured at a particular feature. In an embodiment, prior probability calculator 328 calculates prior probabilities for each feature in a radius R of an initial location to be equally likely.

Viterbi decoder 326 of pose optimizer 214 adjusts the sequence of location data 302 to correspond with the locations of polyline features. In an embodiment, Viterbi decoder 326 models the sequence of adjusted location data as hidden states in a hidden Markov model. In the hidden Markov model, the sequence of location data are observable emissions from the hidden states that are given off with the calculated emission probability calculated by emission probability calculator 328. The probability of transitioning to a second hidden state (a second polyline feature), for example, given that the GPS receiver is at a first hidden state (a first polyline feature) is defined by the transition probabilities calculated by transition probability calculator 328. The probability of the sequence of adjusted location data starting at a particular polyline feature is defined by prior probability calculator 328. Viterbi decoder 326 uses the Viterbi algorithm to decode the most likely sequence hidden states (the sequence of adjusted location data).

The Viterbi algorithm is fast and memory efficient. By using the Viterbi algorithm, Viterbi decoder 326 saves computing resources, such as memory and processor time. In embodiments, pose optimizer 214 may also use Kalman or particle filtering in conjunction with hidden Markov models. This approach is discussed in more detail below. In an embodiment, pose optimizer 214 may model a sequence of polyline features as a probabilistic context-free grammar.

Once the Viterbi decoder 326 determines the sequence of adjusted location data, processing pipeline server 210 writes the sequence of adjusted location data to street track database 220. In FIG. 3, the adjusted location data is represented by snapped location data 304. Snapped location data 304 is the sequence of location data that has been adjusted to correspond to features stored in map database 204.

Each of feature finder 312, distance calculator 314, emission probability calculator 322, transition probability calculator 324, prior probability calculator 328, and Viterbi decoder 326 may be implemented in hardware, software, firmware, or any combination thereof.

Figure 4:
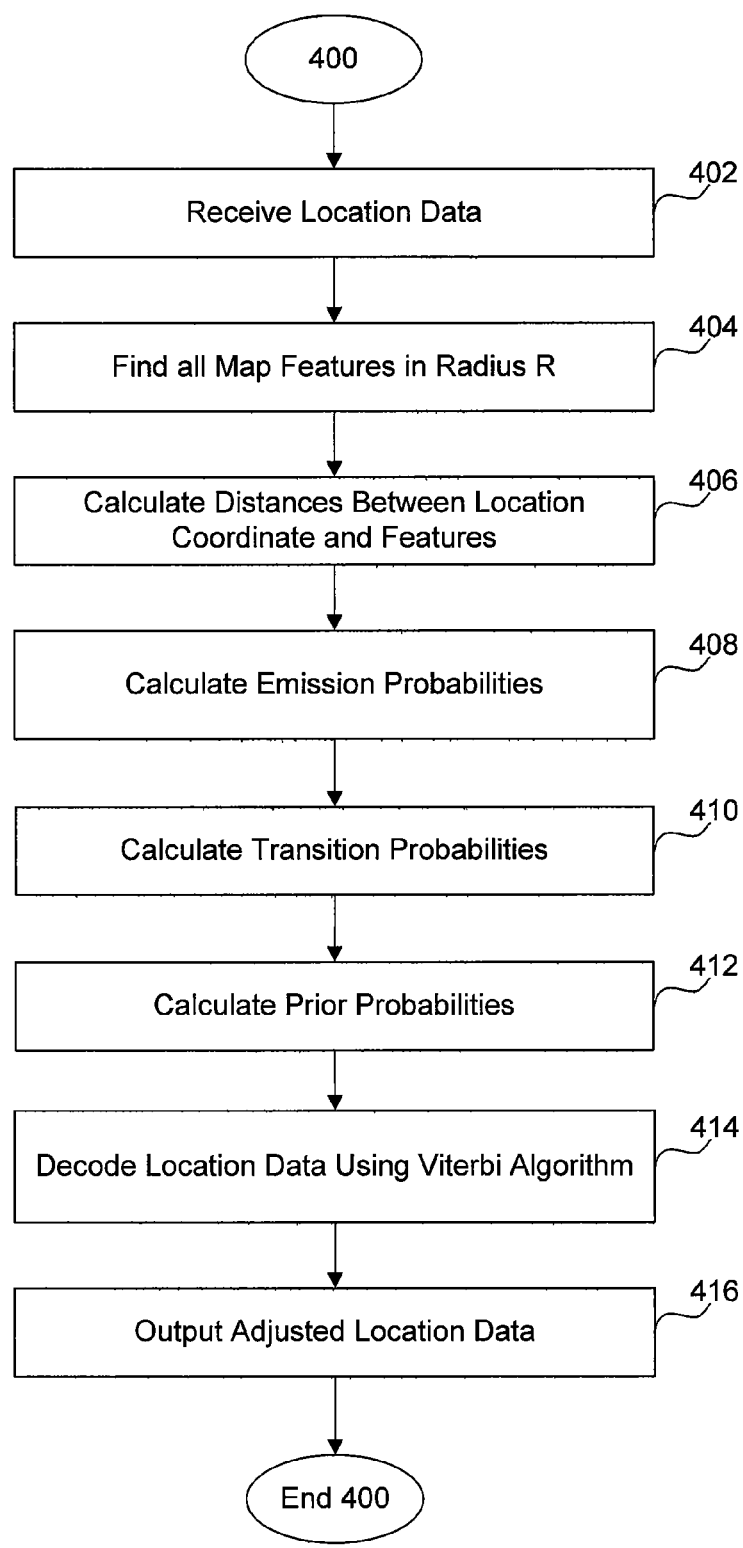
FIG. 4 is a flowchart that illustrates a method for adjusting location data to the location of polyline features on a map according to an embodiment of the present invention.

FIG. 4 is a flowchart of a method 400. Method 400 is used, for example, to adjust location data so that it corresponds to polyline features of a map. Method 400 begins at step 402.

In step 402, a sequence of location data is received, for example using a satellite-based positioning system device (e.g. a GPS receiver). Each location can include coordinate and heading values. The coordinate values can be latitude and longitude values. In an embodiment, the location data is generated/received, for example, by one or more GPS receivers in a vehicle and/or other sensors such as wheel encoders. In embodiments, the location data may be received in real-time or near real-time.

In step 404, for each location in the sequence of location data, polyline features within a radius R are found. In an embodiment, polyline features may be organized into bins, and finding polyline features may include using a map spatial index to get a list of all polyline features. The polyline features may include information such as geometry information, street name information, address information, turn restriction information, intersection information, connectivity information, etc. In an embodiment, the radius R is selected and/or adjusted based on the accuracy/error associated with the location data and/or satellite-based positioning system device used to obtain the location data (e.g., the radius R used if the locations are known to be within 100 feet of the coordinates that are obtained should be larger than the radius R used if locations are known to be within 10 feet of the coordinates that are obtained).

In step 406, for each location in the sequence of location data, distances between the locations and features found in step 404 are calculated.

In step 408, for each location in the sequence of location data, emission probabilities are calculated. An emission probability is calculated for each polyline feature within radius R of a location. The emission probability is a function of a feature and a location. The emission probability is a probability of obtaining the location, for example, from a GPS receiver given that the GPS receiver is actually at a location associated with a particular polyline feature. For each location, emission probability calculator 322 calculates an emission probability for each polyline feature within radius R of the location data.

In step 410, transition probabilities are calculated. A transition probability is a probability of transitioning to a location of a feature given that the GPS receiver is at another feature. In an example, if a transition is allowed from one road to another (e.g., the roads meet at an intersection, and there are no turn restrictions), the transition is associated with a high probability. A disallowed transition (e.g., a transition between two roads that are not connected), is associated with low probability. How transition probabilities are calculated is described in more detail below.

In step 412, prior probabilities are calculated. A prior probability is a probability that the start of the sequence of location data was measured at a particular polyline feature. In an embodiment, prior probabilities are calculated for each feature within the radius R of an initial location to be equally likely. However, in the presence of other inputs, the prior probabilities may be skewed to favor a certain feature (or features).

In step 414, a sequence of adjusted/snapped location data is decoded. In embodiments of this invention, the sequence of adjusted location data are modeled as hidden states in a hidden Markov model. In the hidden Markov model, the sequence of location data are observable emissions from the hidden states that are given off with the calculated emission probability calculated in step 408. The probability of transitioning to a first hidden state (e.g., a first polyline feature) given, for example, that a GPS receiver is at a second hidden state (e.g., a second polyline feature) is defined by the transition probabilities calculated in step 410. The probability of the sequence of adjusted location data starting at a particular polyline feature is determined in step 412. Step 414 uses the Viterbi algorithm to decode the most likely sequence of hidden states (e.g., the sequence of adjusted location data). The Viterbi algorithm is fast and efficient. By using the Viterbi algorithm, method 400 saves resources, such as space and computational time.

In step 416, the sequence of adjusted/snapped location data is outputted. In an example embodiment, the adjusted/snapped location data may be written to a database. A server may retrieve the adjusted/snapped location data from the database. The server may format it for viewing by a user using a client. This example is illustrative and is not intended to limit the invention.

As show in the above embodiment, an entire sequence of location data is adjusted/snapped to the location of a sequences of polyline features. By snapping an entire sequence, as opposed to just individual locations, this embodiment takes into account, for example, the continuity of streets. This constraint enables embodiments of the present invention to correctly adjust/snap location data.

In embodiments, method 400 may include an additional step to use Kalman or particle filtering in conjunction with a hidden Markov model. As an example, Kalman or particle filtering may be used to refine/adjust the accuracy of the hidden Markov model. In that example, the Kalman or particle filtering are applied after the snapped location data are determined using the hidden Markov model.

In an embodiment, method 400 may use a probabilistic context-free grammar to model the sequence of polyline features.

Figure 5A:
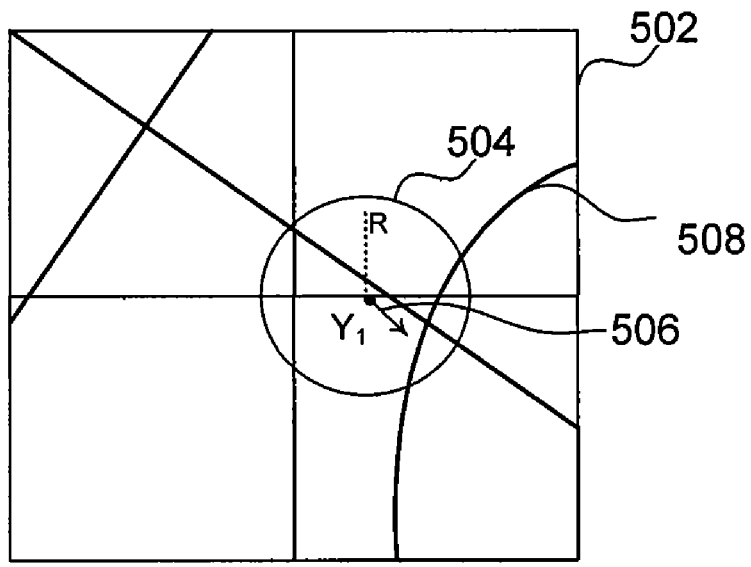
FIGS. 5A and 5B are diagrams that illustrate an example of how features are recalled for a particular location according to an embodiment of the present invention.
Figure 5B:
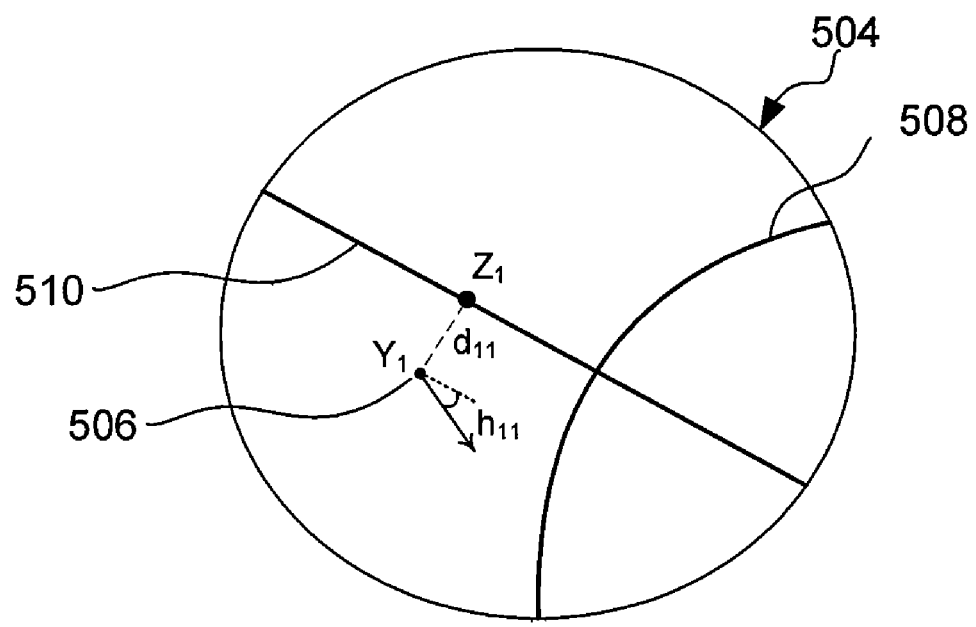

FIGS. 5A and 5B are diagrams that illustrate examples of how features within a radius R are recalled for a particular location. The examples show how to recall features for a particular location data. In practice, features are recalled for each location in a sequence of location data.

FIG. 5A shows four bins. One such bin is bin 502. Each bin represents an area on a map. In an embodiment, each bin represents an area 50 meters by 50 meters square.

In embodiments, each bin contains polyline features. A polyline feature may be, for example, a portion of a street or an intersection. Polyline feature 508 is an example polyline feature. Polyline feature 508 may be associated with data such as, for example, a road name, road geometry, whether the roads is one-way or two-way, etc.

As shown in FIG. 5A, a location 506 ($Y_1$) can be represented by a set of coordinates and a heading. Each coordinate may include a latitude value and a longitude value. As an example, location data 506 may be obtained using a GPS receiver or other sensors, such as wheel encoders.

Referring to FIG. 4 again, recall that in step 404, polyline features within a radius R are found. To recall features within radius R, the bins containing the polyline features must first be identified. In the example in FIG. 5A, the area within radius R is shown as circle 504. Portions of all four bins lie within circle 504. Accordingly, all four bins are recalled so that the subset of the features within circle 504 can be determined.

FIG. 5B is a diagram that illustrates polyline features within circle 504. In FIG. 5B, two polyline features are shown within circle 504. The polyline features are labeled 508 and 510. Referring to FIG. 4, the distances between GPS coordinates and polyline features are calculated in step 406. Accordingly, FIG. 5B shows an example distance $d_{11}$ between location $Y_1$ and the nearest point $Z_1$ on polyline feature 510. Although only one distance is shown in the example, the distance between each of the polyline features 508, 510 and the location $Y_1$ are calculated in practice.

As described herein, a heading differential may also be calculated. In an embodiment, each of polyline features 508, 510 has a geometry that includes a heading. Heading differences may be calculated by taking the difference between the heading of the polyline features at the adjusted location (e.g., location $Z_1$ on feature 510) and the heading of location 506 ($Y_1$). In the example shown, the difference between the heading of location 506 and the heading of polyline feature 510 is shown by $h_{11}$. Although only one heading difference is shown in the example, heading differential between each of the polyline features 508, 510 and the location $Y_1$ are calculated in practice.

The distances and headings described above are determined for use in calculating emission probabilities. Calculating emission probability is discussed in more detail below with reference to FIG. 6B.

Figure 6A:
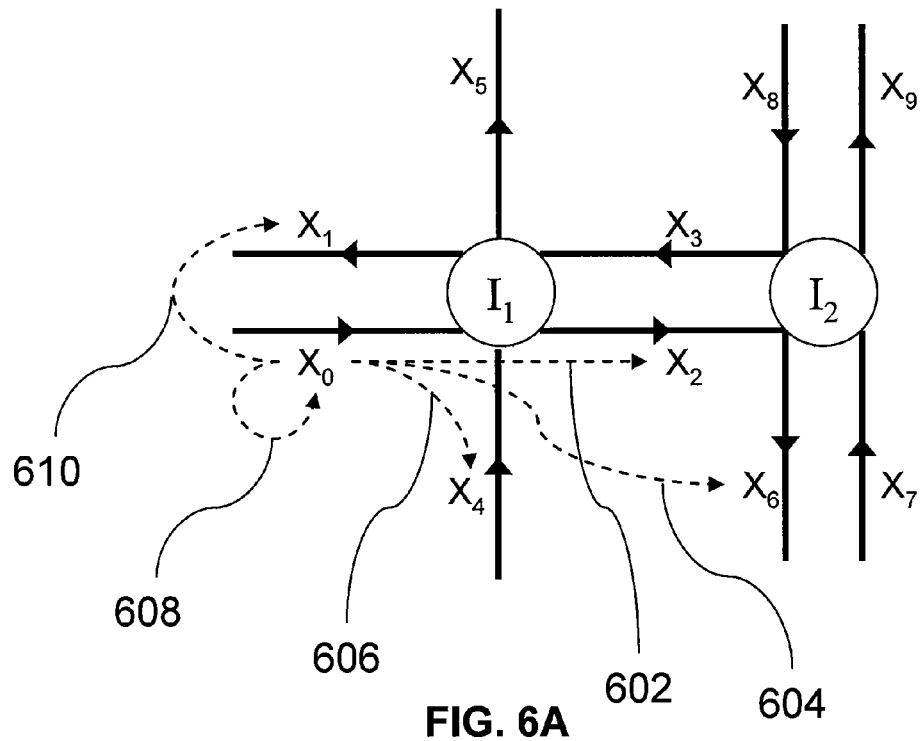
FIG. 6A is a diagram that illustrates an example of how transition probabilities are calculated according to an embodiment of the present invention.

FIG. 6A is a diagram that illustrates an example of how transition probabilities are calculated according to an embodiment of the present invention. As shown in FIG. 6A, streets are represented in embodiments by various polyline features (e.g., polyline features $X_0$ to $X_9$). Note that each side of the street is independently represented. As an example, there is a high transition probability between $X_0$ and $X_2$ (represented by line 602) because those features are connected at intersection $I_1$. "Connected" means that feature $X_0$ terminates at intersection $I_1$ and feature $X_2$ starts at intersection $I_1$. As another example, there is a lower probability of transition between $X_0$ and $X_6$ because those features are not directly connected. In other words, a vehicle carrying a GPS receiver could drive directly from $X_0$ to $X_2$, so there is a high transition probability. But, a vehicle carrying a GPS receiver could not jump directly from $X_0$ to $X_6$, so there is a lower transition probability (represented by line 604). Note that there is also a transition probability for transitioning from $X_0$ onto itself (represented by line 608).

In embodiments, transition probabilities can vary based on feature information. For example, if a U-turn is allowed from $X_0$ to $X_1$, the transition probability (represented by line 610) would be high, but if the U-turn is forbidden (i.e., it is a turn restriction), the transition probability would be low. Similarly, if the street is a one-way street, there may be a low probability of transitioning in a particular direction. For example, the transition probability for a transition from $X_0$ to $X_4$ (represented by line 606) is low since the vehicle cannot turn right from $X_0$ to $X_4$ since the latter is a one-way street and one cannot travel on it in the wrong direction.

In an embodiment, the function to adapt transition probabilities contains parameters. The parameters are selected using adaptive optimization. Examples of adaptive optimization algorithms include, but are not limited to, a hill-climbing algorithm, a stochastic hill-climbing algorithm, an A-star algorithm, and a genetic algorithm.

Figure 6B:
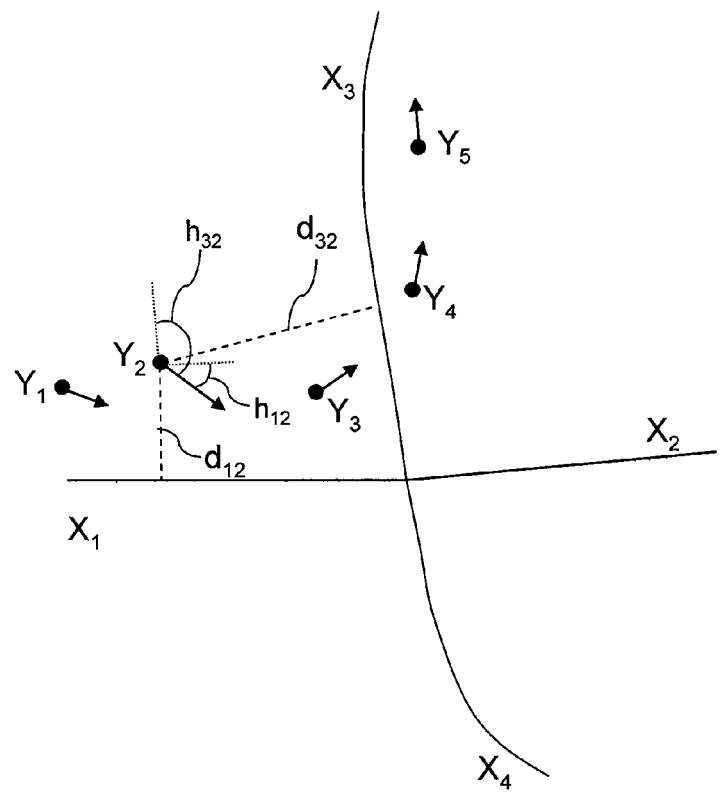
FIG. 6B is a diagram that illustrates an example of how emission probabilities are calculated according to an embodiment of the present invention.

FIG. 6B is a diagram that illustrates an example of how emission probabilities can be calculated according to an embodiment of the present invention. An emission probability is a function of a feature and a location. In an embodiment, the emission probability is a probability of obtaining the location, for example, from a GPS receiver given that the GPS receiver is actually at a location associated with a feature.

FIG. 6B shows polyline features $X_1$, $X_2$, $X_3$, and $X_4$ and a sequence of location data $Y_1$, $Y_2$, $Y_3$, $Y_4$ and $Y_5$. For each location $Y_1$, $Y_2$, $Y_3$, $Y_4$, and $Y_5$, an emission probability is calculated for each polyline feature $X_1$, $X_2$, $X_3$, and $X_4$. In an embodiment, an emission probability may be a function of the distance between the polyline feature and the location and the heading differential between the polyline feature and the location. In an embodiment, the emission probability is calculated using a Gaussian function. An example Gaussian function is:

$$P(Y_m \mid X_n) = \left(Ae^{-d_{nm}^2/2\sigma_D^2}\right) \cdot \left(Be^{-h_{nm}^2/2\sigma_H^2}\right),$$

where $Y_m$ is a location; $X_n$ is a polyline feature; $d_{mn}$ is the distance between location $Y_m$ and polyline feature $X_n$; $h_{mn}$ is the heading differential between location $Y_m$ and polyline feature $X_n$; and A, B, $\sigma_D$, and $\sigma_H$ are parameters. Parameters A and B control the relative weight of distance and heading respectively. Parameter $\sigma_D$ controls how quickly the emission probability decreases as the distance increases. Parameter $\sigma_H$ controls how quickly the emission probability decreases as the heading differential increases.

In an embodiment, an emission probability contains parameters. The parameters may be selected using adaptive optimization. Examples of an adaptive optimization algorithms are noted above. In the example shown in FIG. 6B, the emission probability of receiving location $Y_2$ while the receiver is at $X_1$ is:

$$P(Y_2 | X_1) = \left(Ae^{-d_{12}^2/2\sigma_D^2}\right) \cdot \left(Be^{-h_{12}^2/2\sigma_H^2}\right).$$

In the example shown in FIG. 6B, the emission probability of receiving location $Y_2$ while the receiver is at $X_3$ is:

$$P(Y_2 | X_3) = \left(Ae^{-d_{32}^2/2\sigma_D^2}\right) \cdot \left(Be^{-h_{32}^2/2\sigma_H^2}\right).$$

Distance $d_{32}$ is larger than distance $d_{12}$, and heading differential $h_{32}$ is larger than heading differential $h_{12}$. Because $d_{32}$ is larger than $d_{12}$ and $h_{32}$ is higher than $h_{12}$, the resulting probability $P(Y_2|X_1)$ is going to be larger than the probability $P(Y_2|X_1)$. As a result, the location $Y_2$ is more likely to be adjusted/snapped to a location on $X_1$ than to a location on $X_3$.

Figure 6C:
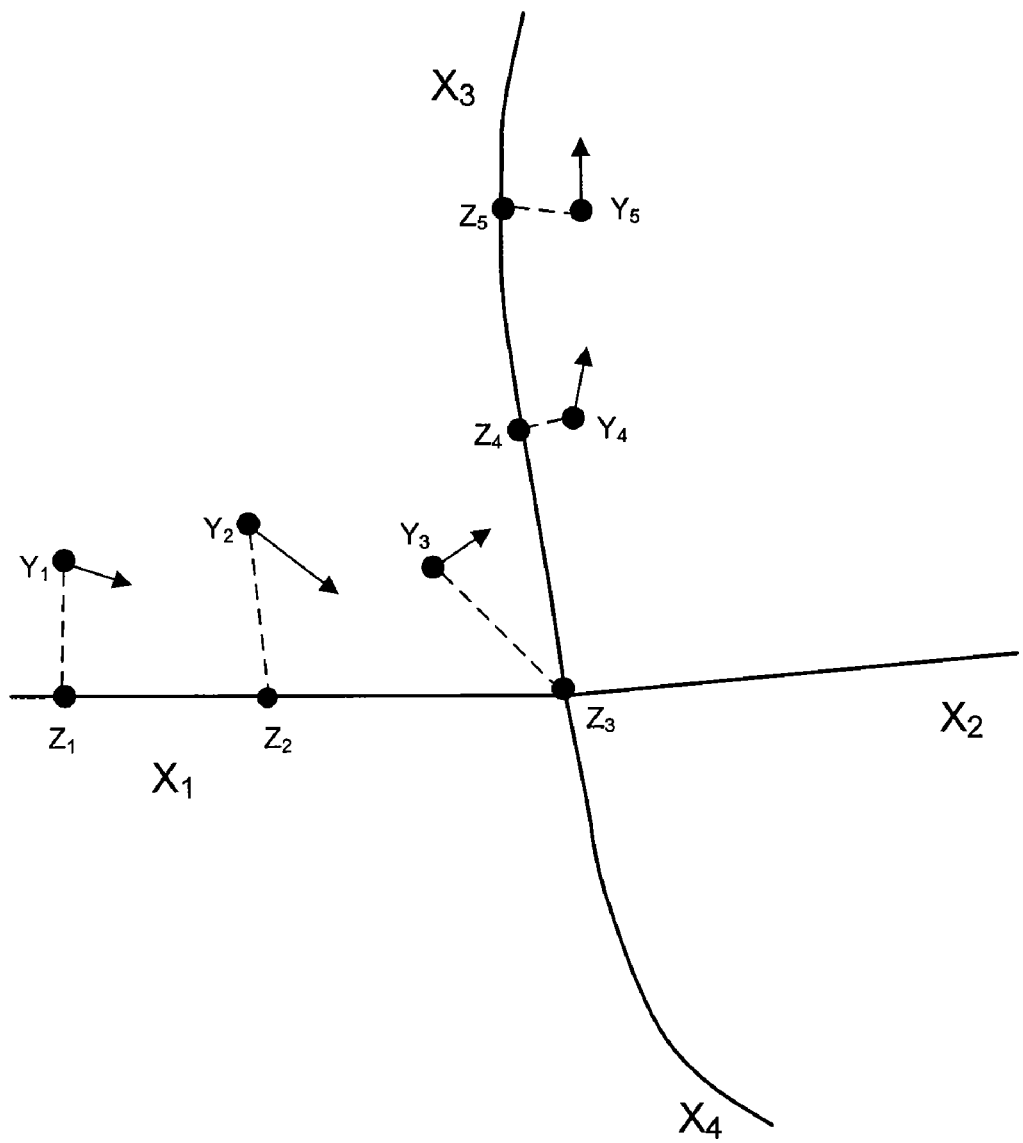
FIG. 6C is a diagram that illustrates an example of how location data is snapped to points on a street according to an embodiment of the present invention.

FIG. 6C is a diagram that illustrates an example of how location data may be snapped to points on a street. In an embodiment, once the transition probabilities, emission probabilities, and prior probabilities are calculated for a sequence of locations, the adjusted locations are determined using the Viterbi algorithm to decode the most likely sequence of hidden states (e.g., the sequence of adjusted location data).

In the example shown in FIG. 6C, the sequence of location data $Y_1, Y_2, Y_3, Y_4$, and $Y_5$ is adjusted to locations $Z_1, Z_2, Z_3, Z_4$, and $Z_5$ respectively, each of which lies on a polyline feature. Note that in this example, two locations $Y_1$ and $Y_2$ are adjusted to positions $Z_1$ and $Z_2$ respectively, both of which lie on the same polyline feature, $X_1$. This is possible because self-transitions between polyline features are allowed. $Y_3$ is snapped to point $Z_3$ which lies at the intersection. As discussed earlier, the polyline features $X_1, X_2, X_3$, and $X_4$ may be modeled as hidden states in a hidden Markov model. As described herein, the entire sequence of locations $Y_0, Y_1, Y_2, Y_3$, and $Y_4$ is optimally snapped to the sequence of locations $Z_1, Z_2, Z_3, Z_4$, and $Z_5$ respectively, which lie on the polyline features in the map. This is based on information about the geometry and connectivity of the street network. This additional constraint results in more accurate adjustment/snapping of location data.

In an example, not intended to limit the present invention, $Z_1, Z_2, Z_3, Z_4$, and $Z_5$ may be the closest points to the locations $Y_0, Y_1, Y_2, Y_3$, and $Y_4$ on the corresponding polyline features $X_1, X_2, X_3$, and $X_4$.

It is to be appreciated that the detailed description section, and not the summary and abstract sections, is intended to be used to interpret the claims. The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for adjusting coordinates obtained using a satellite-based positioning system device, comprising:
    (1) receiving a sequence of coordinates corresponding to a plurality of locations;
    (2) identifying in a map database, for each location, polyline features within a first distance from the coordinates for the location;
    (3) calculating emission probabilities for the polyline features identified in (2), wherein each emission probability $E_{ij}$ represents the probability of obtaining coordinates $C_i$ for a location represented by a polyline feature $P_j$;
    (4) calculating transition probabilities for the polyline feature identified in (2), wherein each transition probability $T_{xy}$ represents the probability of a transition from a polyline feature $P_x$ to a polyline feature $P_y$; and
    (5) adjusting the sequence of coordinates corresponding to the plurality of locations so that the adjusted coordinates correspond to polyline features belonging to a sequence of polyline features selected based on the emission probabilities calculated in (3) and the transition probabilities calculated in (4),
wherein steps (1)-(5) are performed by at least one computing device.

2. The method of claim 1, farther comprising:
    (6) adjusting the sequence of coordinates corresponding to the plurality of locations using information from sensors other than the satellite-based positioning system device.

3. The method of claim 1, wherein (2) comprises selecting the first distance based on an accuracy associated with the sequence of coordinates corresponding to the plurality of locations.

4. The method of claim 1, wherein (3) comprises calculating emission probabilities for the polyline features identified in (2) based on an error associated with the satellite-based positioning system device.

5. The method of claim 1, wherein (5) further comprises:
    (a) modeling the sequence of polyline features as a Hidden Markov Model; and
    (b) decoding the adjusted coordinates using Viterbi decoding.

6. The method of claim 1, wherein (1) through (5) are performed by the satellite-based positioning system device while the device is carried in a vehicle.

7. A method for adjusting location data, comprising:
    (1) identifying in a map database, for a plurality of locations, polyline features within a first distance from each location;
    (2) calculating emission probabilities for the polyline features identified in (1), wherein each emission probability $E_{ij}$ represents the probability of obtaining location $C_i$ for a location on the map represented by a polyline feature $P_j$;

(3) calculating transition probabilities for the polyline feature identified in (1), wherein each transition probability $T_{xy}$ represents the probability of a transition from a polyline feature $P_x$ to a polyline feature $P_y$; and (4) adjusting the plurality of locations so that the adjusted locations correspond to polyline features belonging to a sequence of polyline features selected based on the emission probabilities calculated in (2) and the transition probabilities calculated in (3), wherein steps (1)-(4) are performed by at least one computing device.

8. The method of claim 7, wherein the plurality of locations have associated heading values, and (4) comprises adjusting the associated heading values.

9. The method of claim 7, wherein (2) comprises calculating emission probabilities based on a Gaussian probability function.

10. The method of claim 9, wherein (2) comprises using adaptive optimization to select parameters for the Gaussian probability function.

11. The method of claim 7, wherein (3) comprises calculating transition probabilities using at least one of turn restriction information, intersection information, and one-way street information stored in the map database.

12. The method of claim 7, wherein (5) comprises modeling the sequence of polyline features as a Hidden Markov Model.

13. The method of claim 7, further comprising:
(5) adjusting the plurality of locations with particle filtering.

14. The method of claim 7, further comprising:
(5) adjusting the plurality of locations with Kalman filtering.

15. The method of claim 7, wherein (5) comprises modeling the sequence of polyline features as a probabilistic context free grammar.

16. A system for adjusting location data, comprising:

a spatial indexer that receives a sequence of location data corresponding to a plurality of locations and identifies in a map database, for each location, polyline features within a first distance from the coordinates for the location;

an emission probability calculator that calculates emission probabilities for the polyline features identified by the spatial indexer, wherein each emission probability $E_{ij}$ represents the probability of obtaining location $C_i$ for a location on the map represented by a polyline feature $P_j$;

a transition probability calculator that calculates transition probabilities for the polyline feature identified by the spatial indexer, wherein each transition probability $T_{xy}$ represents the probability of a transition from a polyline feature $P_x$ to a polyline feature $P_y$; and a pose optimizer that adjusts the location data for the plurality of locations so that the adjusted location data correspond to polyline features belonging to a sequence polyline features selected based on the calculate emission probabilities and the calculated transition probabilities.

17. The system of claim 16, wherein the location data includes heading values.

18. The system of claim 16, wherein the emission probability calculator calculates the emission probabilities using a Gaussian probability function.

19. The system of claim 16, wherein the transition probability calculator calculates transition probabilities using at least one of turn restriction information, intersection information, and one-way street information stored in the map database.

20. The system of claim wherein the pose optimizer includes a Viterbi decoder.

\* \* \* \* \*

UNITED STATES PATENT AND TRADEMARK OFFICE
CERTIFICATE OF CORRECTION

PATENT NO.         : 8,209,121 B1  
APPLICATION NO.    : 11/870265  
DATED              : June 26, 2012  
INVENTOR(S)        : Abhijit Ogale Page 1 of 1

It is certified that error appears in the above-identified patent and that said Letters Patent is hereby corrected as shown below:

Column 12
Line 42, Claim 2, please replace "farther" with --further--.

Column 14
Line 20, Claim 16, please replace "sequence" with --sequence of--.

Column 14
Line 21, Claim 16, please replace "calculate" with --calculated--.

Column 14
Line 35, Claim 20, please replace "claim wherein" with --claim 16, wherein--.

Signed and Sealed this  
Sixteenth Day of October, 2012

David J. Kappos  
*Director of the United States Patent and Trademark Office*